US010464661B2

(12) United States Patent
D'Andrea et al.

(10) Patent No.: US 10,464,661 B2
(45) Date of Patent: Nov. 5, 2019

(54) VOLITANT VEHICLE ROTATING ABOUT AN AXIS AND METHOD FOR CONTROLLING THE SAME

(71) Applicant: ETH Zurich, Zurich (CH)

(72) Inventors: Raffaello D'Andrea, Wollerau (CH); Sergei Lupashin, Zurich (CH); Mark W. Mueller, Berkeley, CA (US); Markus Waibel, Zurich (CH)

(73) Assignee: ETH Zurich, Zurich (CH)

(*) Notice: Subject to any disclaimer, the term of this patent is extended or adjusted under 35 U.S.C. 154(b) by 0 days.

(21) Appl. No.: 14/893,851

(22) PCT Filed: Jun. 5, 2014

(86) PCT No.: PCT/EP2014/061752
§ 371 (c)(1),
(2) Date: Nov. 24, 2015

(87) PCT Pub. No.: WO2014/198641
PCT Pub. Date: Dec. 18, 2014

(65) Prior Publication Data
US 2016/0152321 A1    Jun. 2, 2016

Related U.S. Application Data

(60) Provisional application No. 61/832,876, filed on Jun. 9, 2013, provisional application No. 61/888,930, filed
(Continued)

(51) Int. Cl.
*B64C 13/24* (2006.01)
*B64C 27/20* (2006.01)
(Continued)

(52) U.S. Cl.
CPC .............. *B64C 13/24* (2013.01); *B64C 27/08* (2013.01); *B64C 27/20* (2013.01); *B64C 27/32* (2013.01);
(Continued)

(58) Field of Classification Search
USPC ............................................... 701/3
See application file for complete search history.

(56) References Cited

U.S. PATENT DOCUMENTS 3,181,816 A    5/1965  Pfleiderer
5,297,759 A *  3/1994  Tilbor .................... B64C 27/16
                                                    244/17.11
(Continued)

FOREIGN PATENT DOCUMENTS

WO    WO-2010/128489 A2    11/2010
WO    WO-2012/080847 A2    6/2012

OTHER PUBLICATIONS

Y. Kataoka, et al., "Nonlinear Control Model Analysis of Trirotor UAV Model", International Federation of Automatic Control (IFAC); 18th IFAC World Congress, Italy, Aug. 28-Sep. 2, 2011, pp. 10391-10396.
(Continued)

*Primary Examiner* — Jean Paul Cass
(74) *Attorney, Agent, or Firm* — Blank Rome LLP

(57) ABSTRACT

According to a first aspect of the invention, there is provided a volitant vehicle comprising, a body (112), a control unit being configured to compute an estimate of the orientation of a primary axis (130) of said body with respect to a predefined reference frame, wherein said primary axis is an axis about which said vehicle rotates when flying; and at least one propeller (104) attacked to the body, wherein each of said at least one propeller has an axis of rotation (110) which is fixed with respect to said body, is configured to
(Continued)

simultaneously produce a thrust force and a torque, said thrust force having a component along the primary axis, said torque having a component along the primary axis constructively contributing to the vehicle rotating about said primary axis, said torque having a component perpendicular to the primary axis, and all of said at least one propeller rotate with the same handedness about their respective thrust forces.

24 Claims, 7 Drawing Sheets

Related U.S. Application Data on Oct. 9, 2013, provisional application No. 61/891,479, filed on Oct. 16, 2013.

(51) Int. Cl.

| | | |
|---|---|---|
| B64C 39/02 | (2006.01) | |
| B64C 27/08 | (2006.01) | |
| B64D 45/00 | (2006.01) | |
| B64C 27/32 | (2006.01) | |
| G05D 1/00 | (2006.01) | |

(52) U.S. Cl.
CPC .......... *B64C 39/024* (2013.01); *B64D 45/00* (2013.01); *G05D 1/0072* (2013.01); *B64C 2201/024* (2013.01); *B64C 2201/027* (2013.01); *B64C 2201/108* (2013.01); *B64C 2201/127* (2013.01); *B64C 2201/141* (2013.01); *B64C 2201/146* (2013.01); *B64C 2203/00* (2013.01)

(56) References Cited

U.S. PATENT DOCUMENTS

| | | | | |
|---|---|---|---|---|
| 6,422,509 B1* | 7/2002 | Yim | ........................ | B64C 13/16 244/17.23 |
| 6,604,706 B1* | 8/2003 | Bostan | ................... | B64C 17/06 244/17.11 |
| 7,059,931 B2* | 6/2006 | Dammar | ................ | B64C 39/00 244/17.11 |
| 7,204,453 B2* | 4/2007 | Muren | ................... | A63H 27/12 244/17.11 |
| 7,400,950 B2* | 7/2008 | Reich | ..................... | A63H 27/04 701/3 |
| 7,497,759 B1* | 3/2009 | Davis | ..................... | A63H 27/12 244/23 C |
| 7,520,466 B2* | 4/2009 | Bostan | ................... | B64C 3/385 244/93 |
| 7,658,346 B2* | 2/2010 | Goossen | ................. | B64C 27/20 244/17.11 |
| 7,694,914 B1* | 4/2010 | Smith | ................... | A63H 29/22 244/55 |
| 7,871,032 B2* | 1/2011 | Zhao | ...................... | B64C 27/16 244/17.19 |
| 8,066,219 B2* | 11/2011 | Patt | ..................... | B64C 29/0033 244/12.4 |
| 8,109,802 B2* | 2/2012 | Chui | ..................... | A63H 27/12 446/36 |
| 8,931,729 B2* | 1/2015 | Abde Qader Alzu'bi | .................. | B64C 27/20 244/17.13 |
| 9,004,973 B2* | 4/2015 | Condon | ................. | A63H 13/00 446/37 |
| 9,145,205 B2* | 9/2015 | Jarvis | ..................... | B64C 27/12 |
| 9,229,540 B2* | 1/2016 | Mandella | ............ | G06F 3/03545 |
| D761,921 S * | 7/2016 | Schmelter | .................... | D21/441 |
| D763,133 S * | 8/2016 | Ketcher | ........................ | D12/16.1 |
| 9,586,684 B2* | 3/2017 | Carroll | .................... | B64C 11/20 |
| D787,372 S * | 5/2017 | Ketcher | ........................ | D12/16.1 |
| D787,373 S * | 5/2017 | Ketcher | ........................ | D12/16.1 |
| 9,645,580 B2* | 5/2017 | Pedersen | ................. | B60V 1/06 |
| 9,653,637 B2* | 5/2017 | Lee | ..................... | H01L 31/0521 |
| D789,248 S * | 6/2017 | Ketcher | ........................ | D12/16.1 |
| 9,802,225 B2* | 10/2017 | Houston | ............... | G01C 21/20 |
| 9,856,016 B2* | 1/2018 | Mueller | ................. | B64C 27/20 |
| 10,308,349 B2* | 6/2019 | Mueller | ................. | B64C 27/20 |
| 2002/0142699 A1* | 10/2002 | Davis | ..................... | A63H 27/04 446/37 |
| 2004/0162001 A1* | 8/2004 | Davis | ..................... | A63H 27/04 446/236 |
| 2004/0251377 A1* | 12/2004 | Dammar | ............. | B64C 39/00 244/17.11 |
| 2005/0173589 A1* | 8/2005 | Davis | ..................... | A63H 27/04 244/17.11 |
| 2006/0144994 A1* | 7/2006 | Spirov | ..................... | B60V 1/06 244/62 |
| 2006/0231677 A1* | 10/2006 | Zimet | .................... | A63H 27/12 244/17.23 |
| 2011/0059672 A1* | 3/2011 | Davis | ..................... | A63H 27/12 446/45 |
| 2011/0226892 A1* | 9/2011 | Crowther | ................. | B64C 1/30 244/17.23 |
| 2012/0097801 A1* | 4/2012 | Barrett | .................... | B64C 27/24 244/7 A |
| 2012/0321472 A1* | 12/2012 | Davis | .................... | A63H 27/12 416/147 |
| 2015/0108282 A1* | 4/2015 | Kanaoka | ................ | B63H 25/04 244/23 A |
| 2015/0158581 A1* | 6/2015 | Fengler | ................... | B64C 27/08 244/17.23 |
| 2018/0065736 A1* | 3/2018 | Sebesta | ................... | B64C 27/20 |

OTHER PUBLICATIONS

Escareno J., et al., "Attitude Stabilization of a Convertible Mini Birotor", Proceedings of the 2006 IEEE, International Conference on Control Applications, Germany, Oct. 4-6, 2006, pp. 2202-2206.
International Search Report for PCT/EP2014/061752, dated Nov. 26, 2014, 3 pages.

\* cited by examiner

VOLITANT VEHICLE ROTATING ABOUT AN AXIS AND METHOD FOR CONTROLLING THE SAME

RELATED APPLICATIONS

This application is a national phase of PCT/EP2014/061752, filed on Jun. 5, 2014, which claims the benefit of U.S. Provisional Application No. 61/832,876, filed on Jun. 9, 2013, U.S. Provisional Application No. 61/888,930, filed Oct. 9, 2013 and U.S. Provisional Application No. 61/891,479, filed Oct. 16, 2013. The entire contents of those applications are incorporated herein by reference.

FIELD OF THE INVENTION

The present invention relates to the control of volitant vehicles by using at least one propeller, each propeller producing a thrust force in a fixed direction as well as a torque, and each controlled with a single commandable input parameter.

In particular, the invention relates to a volitant vehicle that rotates around an axis and a control scheme that enables to control the motion of the volitant vehicle with fewer propellers than current solutions.

BRIEF SUMMARY

Technical advantages of certain embodiments of the present invention may allow the design of novel vehicles. For example, the present invention allows the design and control of flying vehicles with three, two or only one effector. This may, for example, decrease cost and failure rates by allowing for fewer mechanical components. Their inherent dynamic properties and resulting appearance in flight may make these vehicles appealing for applications in entertainment or for applications that can benefit from rotating vehicles, including surveying, mapping, remote sensing (e.g., LIDAR), and panoramic photography and filmography. Their mechanical simplicity and resulting efficiency gains may also make them appealing for tasks that require the controlled flight or drop of payloads, such as the transport of cargo or airdrops.

In accordance with the present invention, limitations of previous methods for the control of flying vehicles have been substantially reduced or eliminated. In particular, it provides a flying vehicle control scheme for vehicles with as few as one effector.

Technical advantages of certain embodiments of the present invention may allow to improve or simplify the design of existing flying vehicles. For example, flying vehicles may require less mass and face fewer design constraints and inherent limitations than current systems.

Yet other technical advantages of certain embodiments of the present invention may allow it to be tailored to the specific needs of a variety of applications in a variety of contexts. Example applications include hobbyist platforms for communities such as DIY Drones; research platforms for groups actively researching flying platforms or using them as part of their curriculum; military use with requirements such as survivability, power autonomy, detectability, or operation in extreme conditions (weather, lighting conditions, contamination); toys such as small flying vehicles; stage performances including choreographies set to music and light or theater performances which require interaction with theater actors; industrial or public service applications (e.g., surveillance and monitoring of industrial sites, photogrammetry, surveying); professional aerial photography or cinematography; transport or delivery of cargo by air; or inspection and monitoring of civil infrastructure, which may require dangerous or repetitive tasks. In particular, certain technical advantages allow the present invention to be equipped with a wide range of sensors.

Other technical advantages of certain embodiments of the present invention may allow the use of flying vehicles for new applications by allowing their use in a wider variety of operating conditions and environments, or by allowing partial or full automation of certain tasks currently performed by experienced human pilots with both maimed and unmanned flying vehicles. The need for human pilots severely limits the cost-effectiveness, possible operating conditions, and flight endurance of flying vehicles in many applications. For example, even experienced human pilots cannot guarantee safe and efficient control in many real-world operating conditions including wind and turbulence.

According to a first aspect of the invention, there is provided a volitant vehicle comprising, a body, a control unit being configured to compute an estimate of the orientation of a primary axis of said body with respect to a predefined reference frame, wherein said primary axis is an axis about which said vehicle rotates when flying; and at least one propeller attached to the body, wherein each of said at least one propeller has an axis of rotation which is fixed with respect to said body, is configured to simultaneously produce a thrust force and a torque, said thrust force having a component along the primary axis, said torque having a component along the primary axis constructively contributing to the vehicle rotating about said primary axis, said torque having a component perpendicular to the primary axis, and all of said at least one propeller rotate with the same handedness about their respective thrust forces.

Preferably, the torque is that torque about the vehicle's center of mass.

Preferably, the torque and thrust are a non-zero torque and a non-zero thrust.

Preferably, the torque and thrust force produced by each effector are inevitably, and intrinsically, linked.

Preferably, a component of the torque can be due to the effector thrust acting at a distance from the vehicle's center of mass. An additional component of the torque could be from a torque couple generated by the effector itself, for example due to aerodynamic effects on a rotating propeller.

Preferably, said primary axis about which said vehicle rotates when flying is the axis about which the vehicle rotates when flying under the control of said control unit.

Preferably, said rotation about said primary axis is primarily created by the component of the torques acting along the primary axis.

Preferably, said computation of said estimate of the primary axis may be performed in dependence of data representative of the motion of said volitant vehicle, and data representative of the physical characteristics of said volitant vehicle.

Preferably, said data representative of the motion of the vehicle comprises at least one of an orientation of said vehicle, an angular velocity of said vehicle, operational state of said effectors of said vehicle, an acceleration of said vehicle, a translational velocity of said vehicle or a position of said vehicle.

Preferably said data representative of the physical characteristics of said vehicle comprises at least one of the moments of inertia, mass, dimensions, aerodynamic properties or effector properties.

Said data representative of the physical characteristics are preferably stored on a memory unit.

Said computation is preferably carried out on a microcontroller.

Preferably, the volitant vehicle is a heavier-than-air vehicle capable of controlled flight.

Preferably, the control unit is configured to furthermore compute an estimate of the angular velocity of the vehicle, and perform the controlling based on the estimate of the angular velocity.

Preferably, said volitant vehicle is a toy. Here, we define a toy as a device whose principal purpose is for the amusement or recreation, wherein there is some physical interaction between a person and the device.

Preferably, said volitant vehicle is a sensor platform.

Preferably, each propeller is configured to rotate with respect to the body of the vehicle.

Here we define handedness as the property that distinguishes an asymmetric object from its mirror image but not from a rotated object.

Preferably, said control unit is configured to use a model-based observer.

Preferably a Kalman Filter or a Luenberger observer are used to estimate the orientation of the primary axis.

Said control unit may further be configured to control all of said at least one propeller such that all of said at least one propeller collectively produce a torque perpendicular to said primary axis causing said vehicle to move such that the orientation of said primary axis converges to a target orientation with respect to said predefined reference frame.

Preferably, the target orientation with respect to a predefined reference frame can be freely selected, and preferably freely selected at run time, preferably from a range, or specified list, of target orientations.

Preferably, the target orientation with respect to a predefined reference frame can be both attained and maintained.

Preferably, the target orientation with respect to a predefined reference frame can be thought of more specifically as a target orientation angle between the primary axis and the direction of gravity, or the vertical direction in an inertial frame.

Although in principle unbounded, typical target orientations would be in the range 0 degrees to 75 degrees, or more specifically, 0 degrees to 45 degrees from the direction opposite to gravity.

The azimuthal direction of the target orientation can be anywhere in the range of 0 degrees to 360 degrees.

Preferably, all of said at least one propeller are configured to contribute to a resultant thrust force acting on said vehicle, by having each of said at least one propeller attached to the body such that the thrust force having a component along the primary axis constructively contributes to the component of the resultant thrust force along the primary axis.

Preferably, the vehicle can be considered to be acted upon by only the resultant thrust force and the force of the weight of the vehicle, in addition to any torques acting on the vehicle.

Preferably, the thrust force of each of said at least one propeller contributes a fraction of at least 0.5/N to the component of the resultant thrust force along the primary axis when the orientation of the primary axis has converged, where N is the number of said at least one propeller.

More specifically, the thrust force of each of said at least one propeller may contribute a fraction of at least 0.8/N to the component of the resultant thrust force along the primary axis when the orientation of the primary axis has converged, where N is the number of said at least one propeller.

Preferably, for each of said at least one propeller, each of (a) the thrust force having a component along the primary axis constructively contributing to the component of the resultant thrust force along the primary axis, (b) said torque with a component along the primary axis constructively contributing to the vehicle rotating about said primary axis when producing said thrust force, and (c) the torque with a component perpendicular to the primary axis, is achieved through the mechanical arrangement of said axis of rotation.

Preferably, for each propeller, the thrust force is caused by accelerating surrounding air.

Preferably, said mechanical arrangement is such that it results in a simultaneous production of said thrust force and torque.

Preferably, said mechanical arrangement comprises attaching each of the at least one propeller to an effector, said effector being rigidly attached to said body.

Preferably, the effector is an electric motor. Preferably, the effector has a drive axis which then defines the axis of rotation of the propeller. Preferably said drive axis is fixed with respect to the body of the vehicle. Preferably, said effector is a drive shaft of a gearbox.

For each of the at least one propeller, the torque comprises the force acting at a distance from the centre of mass of the vehicle, and a reaction torque opposing the propeller's sense of rotation. Preferably, the reaction torque is caused by drag acting on the propeller blades moving through the air.

Preferably, the torque includes the rate of change of the angular momentum of the propeller.

Preferably, for each of the at least one propeller, at least 50% of the torque component perpendicular the primary axis is due to the thrust force acting at a distance from the centre of mass of the vehicle.

For each of the at least one propeller, the thrust force, the torque component perpendicular to the primary axis, and the torque component along the primary axis, are preferably inevitably, intrinsically linked.

The axes of rotation of said at least one propeller are preferably located in a rotationally symmetric pattern about the center of mass of said vehicle.

Preferably, said volitant vehicle furthermore comprises (a) an input unit for receiving data from sensors and/or users, (b) a sensing unit for measuring data representative of the motion of said volitant vehicle, and (c) an evaluation unit operationally connected to said sensing and/or input unit. Preferably, (i) said evaluation unit configured to provide data representative of the motion of said volitant vehicle based on said data received from said sensing unit, and (ii) said evaluation unit operationally connected to said control unit to provide data, and (iii) said control unit is structured and arranged to perform said computing of an estimate of the orientation of the primary axis based on said data provided by said evaluation unit.

Preferably, said computing of the orientation of the primary axis is done on a microcontroller.

Said control unit may be configured such that it can control said at least one propeller to collectively produce a torque along said primary axis to cause said volitant vehicle to rotate about said primary axis at a speed greater than 0.5 revolutions per second.

Said control unit may be configured such that it can control said at least one propeller to collectively produce a torque along said primary axis to cause said volitant vehicle to rotate about said primary axis at a speed greater than 0.5 revolutions per second when the vehicle is hovering.

Said control unit may be configured such that it can control said at least one propeller to collectively produce a torque along said primary axis to cause said volitant vehicle to rotate about said primary axis at a speed greater than 1 revolutions per second.

Preferably, the propellers are structured and arranged such that the torque components along the primary axis cause the vehicle to have a continuous, ongoing rotation about the primary axis when flying.

Preferably, said 0.5 or 1 revolutions per second are average rotational speeds of the vehicle about the primary axis during a predefined time interval.

More preferably, said 0.5 or 1 revolutions per second are rotational speeds of the vehicle about the primary axis when the orientation of the primary axis has converged to the target orientation.

Preferably said torque along said primary axis can cause said rotation and said rotation is a continuous, ongoing rotation.

Preferably, said control unit is configured to control, for each of said at least one propellers, a single variable of a plurality of variables affecting each of said at least one propellers, wherein said plurality of variables comprises at least one of
1. rotational speed,
2. a propeller pitch angle,
3. voltage,
4. electric current,
5. fuel flow,
6. motor torque,
7. mass flow,
8. power.

Preferably, the single variable is a scalar value, e.g. a magnitude, and not a vector. Furthermore, said single variables can also be considered as signals such as effector control signals.

Preferably, the single variable sets both the thrust force and the torque, simultaneously.

Preferably, said controlling of a single variable of a plurality of variables of each of said at least one propellers is achieved using an electronic speed controller, operationally connected to said control unit and each of said at least one propeller.

Preferably, said control unit is further structured and arranged (a) to compute a target acceleration for said volitant vehicle based on said data provided by said evaluation unit, and (b) to use said target acceleration to compute said target orientation of said primary axis for said volitant vehicle, and (c) to send said control signals to said effectors such that said at least one propeller is controlled such that the thrust collectively produced by said at least one propeller accelerates said volitant vehicle at said target acceleration.

Preferably, said control unit is further configured to compute said target orientation of said primary axis using said target acceleration of said volitant vehicle by computing said target orientation using the equation $$\tilde{n} = \frac{(a-g)}{\|a-g\|}$$

wherein the vector a represents said target acceleration and the vector g represents the gravitational acceleration, and the vector ñ represents said target orientation, and $\|\cdot\|$ represents the Euclidean norm of a vector.

Preferably, said control unit is further configured to compute a target thrust force magnitude based on said data provided by said evaluation unit, and to send said control signals to said effectors such that the magnitude of the resultant thrust force equals the target thrust force magnitude.

Said control unit may further be configured to compute a target thrust force magnitude based on said data provided by said evaluation unit, and to send said control signals to said effectors such that the magnitude of the resultant thrust force over a predefined period equals the target thrust force magnitude.

Preferably, said control unit is further configured to compute said target thrust force magnitude using said target acceleration of said volitant vehicle by,
computing said target acceleration,
computing said target thrust force magnitude as $$f_{des} = m\|a-g\|$$

wherein $f_{des}$ represents the target thrust force magnitude, $\|\cdot\|$ represents the Euclidean norm of a vector, a represents the said target acceleration, g represents the acceleration due to gravity and m represents the mass of said volitant vehicle.

Preferably, said volitant vehicle further comprises a sensor which is operationally connected to said sensing unit and structured and arranged to detect data representative of the motion of the volitant vehicle, and to provide said data representative of the motion of the volitant vehicle to said sensing unit.

Preferably, the sensor belongs to the group of inertial sensors, distance sensors, or rate sensors. Preferably, the sensor belongs to the group of accelerometers, gyroscopes, magnetometers, cameras, optical flow sensors, laser or sonar range finders, radar, barometers, thermometers, hygrometers, bumpers, chemical sensors, electromagnetic sensors, air flow sensors or relative airspeed sensors, ultra sound sensors, microphones, radio sensors, or other height, distance, or range sensors, or infra-red sensors.

Preferably, said control unit is mechanically independent of said body and said at least one propellers, and operationally connected to the volitant vehicle via a wireless connection.

Preferably, said mechanically independent control unit is contained in a housing structured and arranged to be held in the hand of a user and structured and arranged to receive input from said user via a user interface usable to control one or more of said at least one propellers of said volitant vehicle via said wireless connection.

Such a handheld device could be in the form of a smartphone, or a tablet computer device, or it could be in the form similar to traditional hobbyist remote controllers.

According to a further aspect of the present invention, there is provided a method for operating a volitant vehicle, said volitant vehicle comprising a body, at least one propeller, the axis of rotation of each propeller fixed with respect to the body, the method comprising the steps of computing an estimate of the orientation of a primary axis of said body with respect to a predefined reference frame, wherein said primary axis is an axis about which said vehicle rotates when flying; controlling said at least one propeller, based on said estimate of the orientation of the primary axis of said body with respect to said predefined reference frame, such that each of said at least one propeller simultaneously produces a thrust force and a torque, said thrust force having a component along the primary axis, said torque having a component along the primary axis constructively contributing to the vehicle rotating about said primary axis, said torque having a component perpendicular to the primary axis, and all of said at least one propeller rotate with the same handedness about their respective thrust forces.

Preferably, for each of the propellers, said controlling comprises controlling the thrust force produced, with the torque being fully defined by the thrust force.

Preferably, the propellers are controlled such that the torque components along the primary axis cause the vehicle to have a continuous, ongoing rotation about the primary axis when flying.

Preferably, an estimate of the angular velocity of the vehicle is computed, and the controlling of the propellers is performed based on the estimate of the angular velocity.

Preferably, said method further comprises the step of controlling all of said at least one propellers such that, all of said at least one propellers collectively produce a torque perpendicular to said primary axis causing said vehicle to move such that the orientation of said primary axis converges to a target orientation with respect to said predefined reference frame.

Preferably, by turning the vehicle through a secondary axis, the vehicle's angular velocity components about the primary axis and the secondary axis will interact to produce an angular acceleration (and thus a turning) about a turning axis. This may allow for controlled flight with only one or two propellers.

Preferably, to cause the orientation of the primary axis to converge to a target orientation, and while the vehicle has an ongoing rotation about the primary axis, the vehicle body can be turned about a turning axis (preferably at a non-zero angle with respect to the primary axis). The effect of the two components of rotation, by Euler's equations of motion governing the evolution of the angular velocity of a rigid body, can preferably be exploited to create an angular acceleration (and thus velocity) linearly independent of the primary rotation as well as the rotation about the turning axis.

Therefore, even if the effectors can not produce sufficient torque in a direction perpendicular to the primary axis, the present invention allows to exploit this coupling effect inherent in the attitude dynamics to achieve full attitude control. This is particularly relevant and useful for the case of a vehicle with only one or two effectors.

In this present invention, attitude control means using a control unit to control the orientation of a primary axis of said vehicle.

For a propeller, a torque couple exists that produces a torque opposing the propeller's rotation, due to air resisting the motion of the propeller blades. This can contribute to the torque component in the direction of the primary axis.

Preferably, all of said at least one propeller contribute to a resultant thrust force acting on said vehicle, by controlling each of said at least one propeller such that the thrust force has a component along the primary axis constructively contributing to the component of the resultant thrust force along the primary axis.

The vehicle may be considered to be acted upon by only the resultant thrust force and the force of the weight of the vehicle, and various torques.

Preferably, the thrust force of each of said at least one propeller contributes a fraction of at least 0.5/N to the component of the resultant thrust force along the primary axis when the orientation of the primary axis has converged, where N is the number of said at least one propeller.

More preferably, the thrust force of each of said at least one propeller contributes a fraction of at least 0.8/N to the component of the resultant thrust force along the primary axis when the orientation of the primary axis has converged, where N is the number of said at least one propeller.

Preferably, said torque along said primary axis causes said vehicle to rotate about said primary axis at a speed greater than 0.5 revolutions per second.

Preferably, said torque along said primary axis causes said vehicle to rotate about said primary axis at a speed greater than 1 revolution per second.

Preferably, the propellers are controlled such that the torque components along the primary axis cause the vehicle to have a continuous, ongoing rotation about the primary axis when flying.

Preferably, said method further comprises the steps of (a) computing a target acceleration for said vehicle, and (b) using said target acceleration to compute said target orientation of said primary axis for said vehicle, and wherein said controlling one or more of said at least one propeller additionally comprises the step of controlling said at least one propeller so that the thrust collectively produced by said at least one propeller accelerates said vehicle at said target acceleration.

Preferably, the step of computing said target orientation of said primary axis using said target acceleration of said vehicle comprises the step of, computing said target orientation using the equation $$\tilde{n} = \frac{a - g}{\|a - g\|}$$

wherein the vector a represents said target acceleration and the vector g represents the gravitational acceleration, and the vector ñ represents said target orientation, and $\|\cdot\|$ represents the Euclidean norm of a vector.

Preferably, said method comprises the additional step of computing a target thrust force magnitude, and wherein said step of controlling one or more of said at least one propellers, based on said estimate of the orientation of the primary axis of said body with respect to the predefined reference frame and said estimate of the angular velocity of the vehicle, comprises controlling said at least one propellers such that the magnitude of the sum of the components of each of said thrust forces produced individually by said at least one propeller along said primary axis equals said target thrust force magnitude.

Preferably, said method comprises the additional step of computing a target thrust force magnitude, and wherein said step of controlling one or more of said at least one propellers, based on said estimate of the orientation of the primary axis of said body with respect to the predefined reference frame and said estimate of the angular velocity of the vehicle, comprises controlling said at least one propellers such that the magnitude of the sum of each of the components of said thrust forces produced individually by said at least one propeller along said primary axis averaged over a predefined time period equals said target thrust force magnitude.

Preferably, said step of controlling said at least one propeller comprises, controlling each of said at least one propeller to each contribute at least 20% to the component of the target thrust force along the primary axis when the orientation of said primary axis has converged to said target orientation.

Preferably, the step of computing said target thrust force magnitude using said target acceleration of said vehicle comprises the steps of (a) computing said target acceleration and (b) computing said target thrust force magnitude as $$f_{des} = m\|a-g\|$$

wherein $f_{des}$ represents the target thrust force magnitude, $\|\cdot\|$ represents the Euclidean norm of a vector, a represents the said target acceleration, g represents the acceleration due to gravity and m represents the mass of said vehicle.

Preferably, said method further comprises the steps of,
1. computing a target translational velocity of said vehicle,
2. computing a target position of said vehicle,
3. estimating the current translational velocity of said vehicle,
4. estimating the current position of said vehicle,
5. using at least one of said target translational velocity, said target position, said current translational velocity and said current position of said vehicle, to compute said target acceleration.

Preferably, said method uses all of said target translational velocity, said target position, said current translational velocity and said current position of said vehicle to compute said target acceleration.

A preferable method for how these estimates could be used would be as follows. Let $v_{des}$ and $p_{des}$ represent the target velocity and position of the vehicle, respectively, and let v and p represent the estimates of the current velocity and current position of the vehicle, respectively, and define the target acceleration as $a_{des}$. If the vehicle tracks this target acceleration, the vehicle's position and velocity will converge to the target if the target acceleration is selected as follows:

$$a_{des} + 2\zeta\omega_n(v-v_{des}) + \omega_n^2(p-p_{des}),$$

wherein the parameter $\zeta$ represents a damping ratio, and $\omega_n$ represents a natural frequency, with both $\zeta$ and $\omega_n$ design parameters. A typical choice would be something similar to $\zeta=0.7$ and $\omega_n=2\text{rad/s}$. Note that the above equation is just one method for parameterising the target acceleration in terms of the current and target position and velocity, with many others apparent to a person skilled in the arts, given the benefits of the present invention.

Said controlling the velocity may allow, for example, to minimize the energy of a toy when flying with effectors that do not produce enough thrust to keep the vehicle airborne.

For example, by making the target position constant, and moving the vehicle to this position (e.g., by controlling its acceleration), the vehicle can be in a hover state, where 'hover' here is used to mean remaining substantially at one point in space.

Preferably, each of said at least one propellers individually produces a torque which has a non-zero component along said primary axis.

Preferably, said controlling comprises controlling, for each of said at least one propeller, a single variable of a plurality of variables affecting each of said at least one propellers, wherein said plurality of variables comprises at least one of
rotational speed,
propeller pitch angle,
voltage,
electric current,
fuel flow,
motor torque,
mass flow,
power.

Preferably, said controlling comprises controlling exactly three propellers. More preferably, said controlling comprises controlling exactly two propellers. Yet more preferably, said controlling comprises controlling exactly one propeller.

Other technical advantages of the present invention will be readily apparent to one skilled in the art from those following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the invention, reference is made to the following description and accompanying drawings, in which.

DETAILED DESCRIPTION

Figure 1:
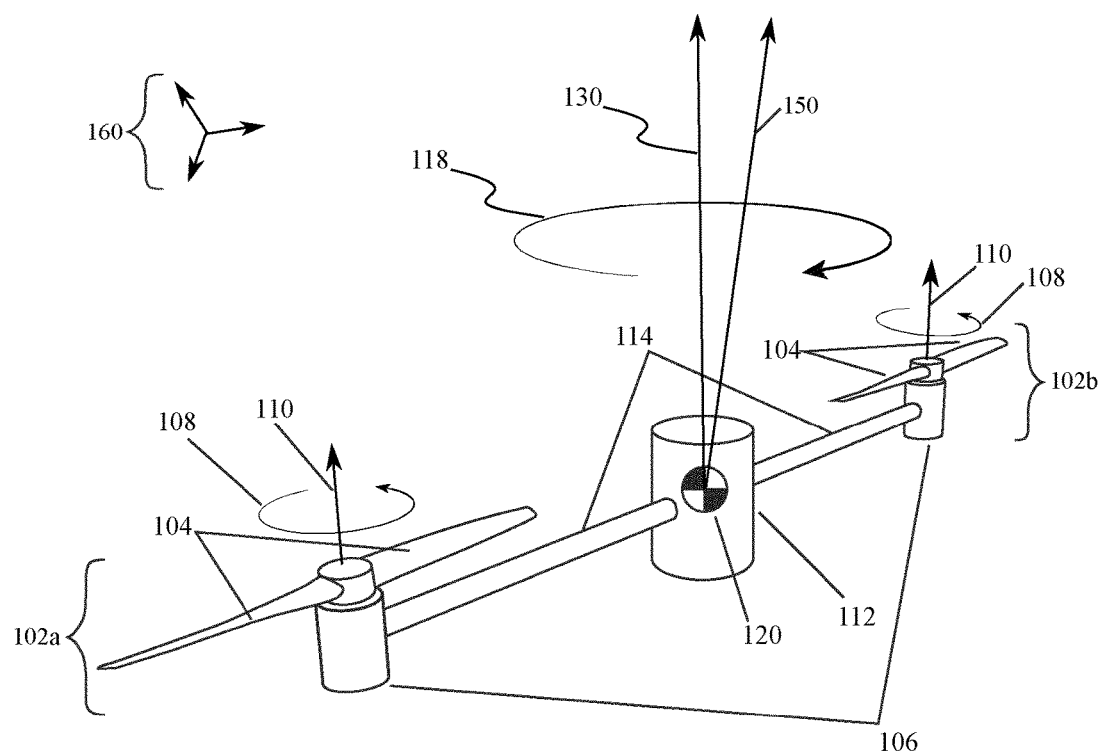
FIG. 1 shows a schematic of a first preferred embodiment of a volitant vehicle with two fixed-pitch propellers driven by electric motors rigidly attached to the vehicle body.

The disclosed invention relates to design and the control of motion of a volitant vehicle (used here to include heavier-than-air devices capable of atmospheric flight and others) equipped with at least one propeller that each produces both a thrust force and a torque acting on the vehicle. These propellers are characterized by having an axis of rotation (typically identical to the direction of thrust force), which is fixed with respect to the body of the vehicle, and by preferably having a single commandable input parameter which controls the thrust force. The torque is typically, though not always, simply the result of the thrust force acting at a distance from the vehicle's centre of mass. For example, the fixed-pitch propellers used on many hover-capable aerial vehicles such as multicopters produce a thrust force and torque acting on the vehicle, and are typically directly fixed to a motor's fixed drive axis and commanded using a single input parameter. Brushless motors are often used to drive fixed pitch propellers, which typically use a motor controller to convert this single input parameter into amplitude, waveform, and frequency required to achieve a desired propeller speed. Such motor controllers typically contains 3 bi-directional outputs (i.e. frequency controlled three phase output), which are controlled by a logic circuit, but can have more complex implementations involving additional sensors and electronics to achieve high performance or other desirable properties. For an Electronic Speed Controller the single input parameter would be an encoded command, for example a desired speed sent as a byte over an I2C bus.

A defining characteristic of the present invention is that the disclosed control scheme results in an ongoing rotation of the vehicle about a primary axis fixed with respect to the body of the vehicle and passing through its center of mass. Effectors are arranged in such a way that in addition to providing a force along their axes of rotation, they also create a torque acting on the vehicle's center of mass and with a component perpendicular to the primary axis. Such a torque could be achieved, for example, by fixing the axis of rotation of the effector in a direction with respect to the primary axis and at a displacement from the center of mass such that the moment of the thrust force (obtained through the cross product) has a component perpendicular to the primary axis.

To achieve and sustain this rotation of the vehicle about the primary axis, the effectors can further be made to produce a torque with a component in the direction of the primary axis. For the example of the fixed-pitch propeller, the torque component can also be achieved by placing the axis of rotation of the propeller parallel to the primary axis, and using the aerodynamic reaction drag torque acting to oppose the propeller's rotation (and thus acting in the direction of the primary axis).

The motion of this volitant vehicle is described by referring to a predefined reference frame, preferably an inertial reference frame. By neglecting the rotation of the Earth about its own axis, and about the sun, and the sun's rotation through the milky way, an Earth-fixed frame can be used as an approximation for an inertial reference frame. Thus, an Earth-fixed reference frame can be constructed by letting a first axis point from West to East, a second axis point South to North, and the final axis pointing from the center of the earth upward. Such a frame has proven to be a good approximation for objects moving at low speeds and over short distances. For greater accuracy, frames can be constructed with one direction pointing from the sun's center of gravity in a direction normal to the ecliptic plane (the plane through which the earth's center of mass moves as it rotates about the sun), and a second direction pointing to the First Point of Aries (or the vernal equinox), with the third direction following from the right hand rule.

FIG. 1 shows an exemplary arrangement of a preferred embodiment for a novel volitant vehicle with two effectors 102a and 102b, each in the form of a fixed-pitch propeller 104 each driven by a motor 106, both rotating in the same direction 108. The vehicle body 112 consists of effectors 102 (excluding their rotating propellers 104 and parts rotating with them) which are rigidly attached using a mechanical structure 114. The mechanical structure 114 and vehicle body 112 also house sensors, cabling, electronics, and other components of the vehicle (none shown). The vehicle's center of mass 120 is marked with a bi-colored circle. The propellers 104 spin about parallel axes of rotation 110, with the aerodynamic reaction drag torque of the propellers 104 resulting in a sustained rotation of the entire vehicle body 112 about a primary axis 130. The orientation of the primary axis 130 in a predefined reference frame 160 is controlled to achieve a desired orientation of the primary axis 150 with the disclosed control method, by sending inputs to the two effectors 102a and 102b.

Figure 2:
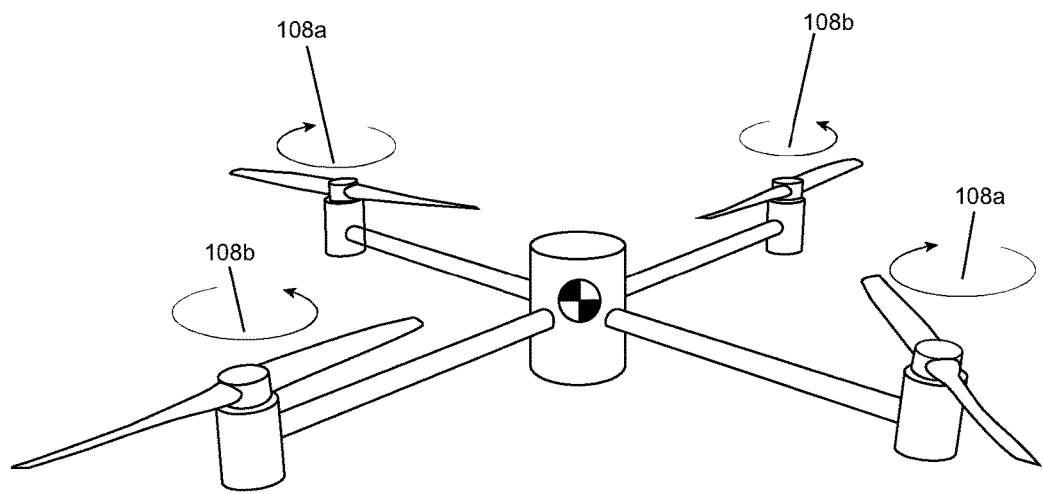
FIG. 2 shows a schematic of a quadrocopter as known in the prior art.

FIG. 2 shows a quadrocopter as known in the prior art, with two pairs of fixed-pitch propellers, one pair rotating in the clockwise direction 108a and the other pair counterclockwise 108b. Propellers typically have two, three, or four blades and are sometimes also called "rotary wings" or "rotors" and defined to also include all rotating parts of a motor used to move them. Multicopters are hover-capable vehicles with multiple propellers. Typical arrangements use four, six, or eight propellers, which are commonly referred to as quadrocopters, hexacopters, and octocopters, respectively, and are well known in the prior art and widely used. However, many variations including 16 and more propellers arranged in many configurations (e.g., with aligned as well as inclined or inverted axes; arranged individually or contrarotating; exposed or encased in ducts or protective shrouds) are in use. Multicopters typically use fixed-pitch blades whose propeller pitch does not vary as the blades rotate for mechanical simplicity. This mechanical simplicity and the resulting ease of construction, combined with high agility and the ability to maintain position (hover) make multicopters the platform of choice for many aerial applications.

Multicopter motion is typically controlled via control signals to the vehicle's effectors to vary the relative speed of each propeller, to change the thrust and torque. Translational motion in the direction of thrust of the four propellers (sometimes "total thrust" or "collective thrust") is controlled by changing the individual thrusts of each of the propellers to achieve the desired total force. Independent of the collective thrust, rotation about the direction of the total thrust (usually called "yaw") is controlled by spinning up either the clockwise or the counterclockwise pair of propellers while respectively slowing down the other pair, thereby producing a torque produced by the difference of drag effects between the two pairs of propellers. Independently of the above, rotation about the other axes is controlled by using thrust difference between opposite propellers, while maintaining the independent relationships described above to control yaw and total thrust as desired. In total, four independent motion properties ("degrees of freedom") of the multicopter, one translational and three rotational, are thus independently controlled by appropriately modulating the thrusts produced by the propellers. With some minor variation, this principle of operation typically applies to all commonly used multicopter vehicles. Full translational control is then achieved by orienting the total force in the direction of desired translational motion.

Figure 3:
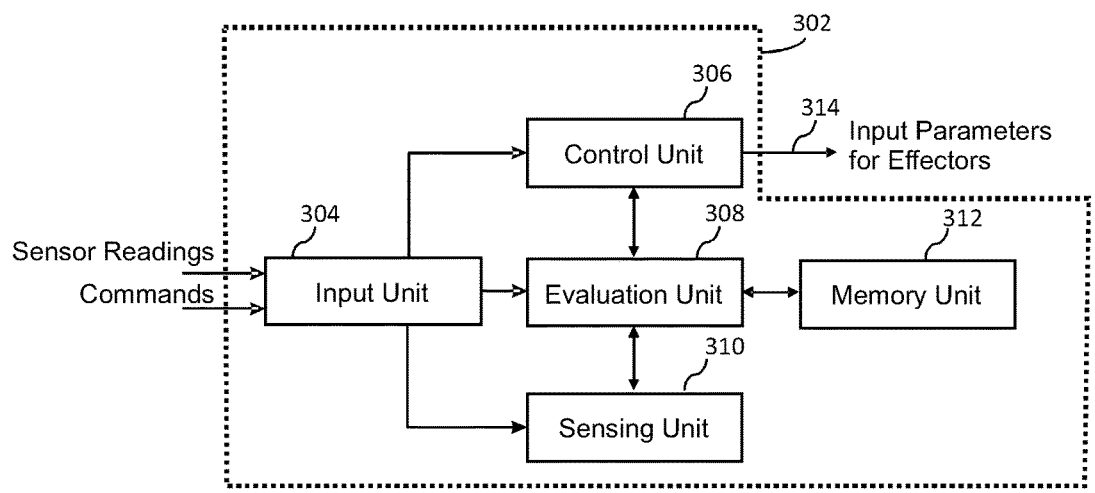
FIG. 3 shows a block diagram of a flight module and its parts.

FIG. 3 shows an example of a flight module for a volitant vehicle that can be used as part of the disclosed control scheme. Such a flight module is typically implemented on-board or both on-board and off-board (e.g., with a control unit 306 directly connected with the on-board motors but also receiving inputs via an input unit 304 from off-board sensors via an off-board sensing unit 310 such as a camera tracking system). Flight modules are typically used to process vehicle inputs (e.g., user commands, sensor readings) and to compute outputs (e.g., input parameters for effectors 314). For example, they allow active self-stabilization by generating control outputs for the flight effectors (e.g. the propellers 104) as well as for any other effectors or actuators. In multicopters, for example, flight modules are used in various operating modes including remote control by an operator with a direct line of sight to the vehicle; controlled remotely by relaying sensor data to a pilot and relaying control signals back to the vehicle (sometimes referred to as "telepresence"); or in partial or full autonomous modes of operation.

Flight modules typically receive high level inputs in the form of goals or commands from a user, base station, command center, or high level control algorithm via an input unit 304 and passed on to a control unit 306, evaluation unit 308, and sensing unit 310. Control units 306 are typically used to generate control signals for a vehicle's effectors. Evaluation units 308 are typically used to evaluate data from input units 304, sensing units 310, and memory units 312. Such data may be representative of user commands or high level commands as well as both relative or absolute position, particularly that of GPS sensors, visual odometry/SLAM, retro-reflective positioning systems, laser range finders, WiFi positioning systems, barometric altimeters and variometers, or ultra-sound sensors (none shown). Sensor data may be gathered and preprocessed using a sensor unit 310 or stored in a memory unit 312. Typical examples of processed information are those received from sensors, such as accelerometers, gyroscopes, magnetometers, cameras, optical flow sensors, laser or sonar range finders, radar, barometers, thermometers, hygrometers, bumpers, chemical sensors, electromagnetic sensors, air flow sensors, or microphones (none shown). Memory units 312 are typically used to store data. For example, they may be used to store data on past sensor readings, operational states or user commands, as well as properties of the vehicle.

All of the above units may be implemented on a single circuit board, on a single board computer, or on a single microcontroller.

Depending on the application, flight modules may be far more complex than the simple block diagram shown in FIG. 3 and may, in particular, comprise multiple input units 304, control units 306, evaluation units 308, sensing units 310, and memory units 312 arranged in a single block 302 or multiple blocks.

Figure 4:
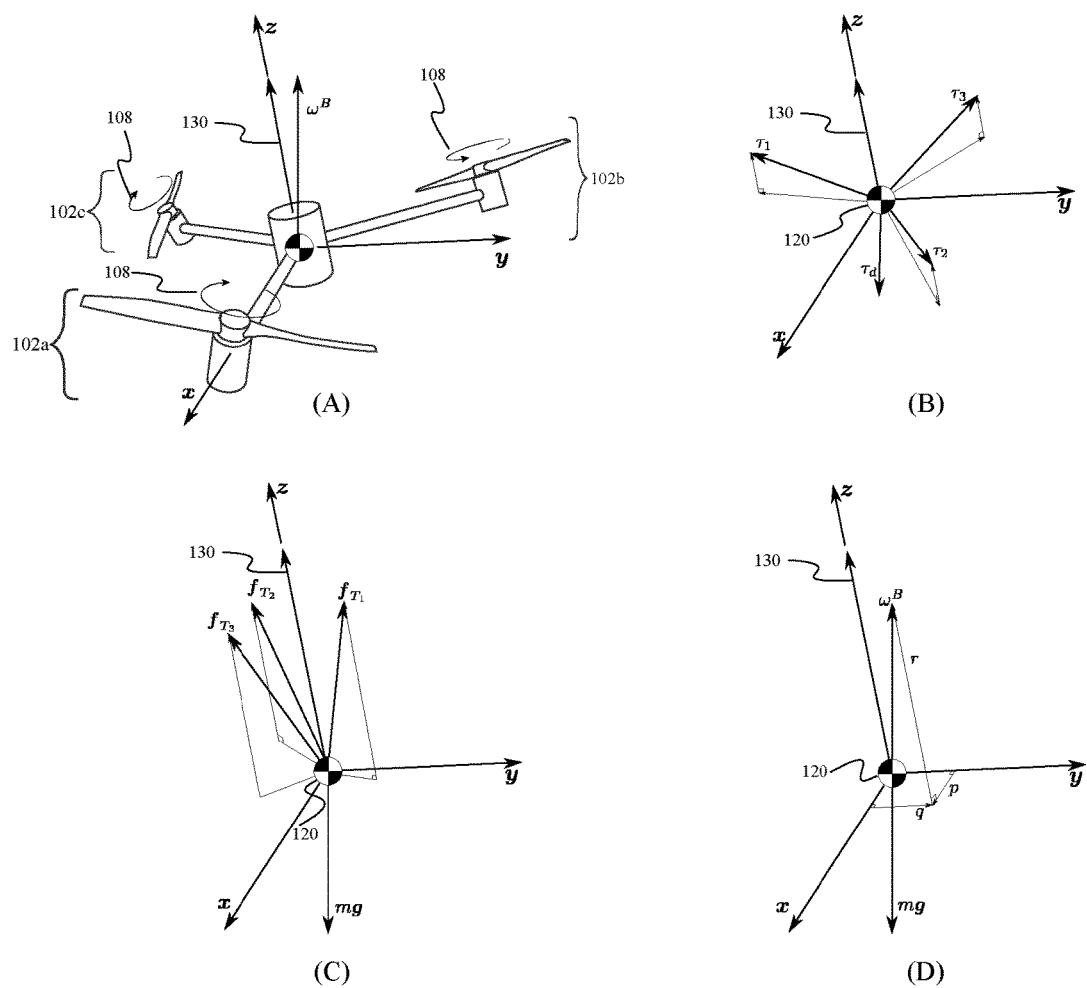
FIG. 4 shows a schematic of a second preferred embodiment of an aerial vehicle with three fixed-pitch propellers driven by rigidly attached electric motors, and its main torques and forces used to explain the derivation of the control method.

FIG. 4 shows another exemplary embodiment for a novel volitant vehicle. This embodiment features three rigidly attached effectors each with a fixed-pitch propeller, and each with a fixed axis of rotation with respect to the vehicle's body inclined with respect to each other. During nominal hover operation, the forces and torques create a sustained rotation of the vehicle body about the primary axis 130. A coordinate system is defined fixed with respect to the vehicles body, consisting of the directions x, y and z, where z is chosen such that it coincides with the primary axis 130, and x lies perpendicular to z and points from the center of mass 120 to the first effector. y follows from the right-hand-rule. The three instantaneous rates of rotation for the vehicle, p, q, r are defined about the vehicle body-fixed axes x, y, z, respectively. Note that, during hover, the vehicle remains at one position while continuously rotating about the primary axis.

As illustrated, the vehicle body has an instantaneous angular velocity $\omega^B$, that is nominally aligned with the primary axis, but may deviate in direction and magnitude during corrective or commanded motion.

The rotation of this body fixed frame with respect to a predefined reference frame 160 (assumed to be inertial) is described by the rotation matrix R, governed by the differential equation $$\dot{R} = R [\![ \omega^B \times ]\!] \quad (1)$$

where $\omega^B = (p, q, r)$ is the angular velocity of the vehicle as shown with its components in FIG. 4(D), expressed in the coordinate system fixed to the vehicle body, and $[\![ \omega^B \times ]\!]$ is the matrix form of the cross product, such that $$[\![ \omega^B \times ]\!] = \begin{bmatrix} 0 & -r & q \\ r & 0 & -p \\ -q & p & 0 \end{bmatrix}. \quad (2)$$

The direction z of the primary axis 130 in the predefined reference frame 160, also known as the orientation of the primary axis of the vehicle, can be expressed as $$z = R^T \begin{bmatrix} 0 \\ 0 \\ 1 \end{bmatrix}, \quad (3)$$

such that the differential equation of the orientation can be found with (1):

$$\dot{z} = R \begin{bmatrix} 0 & -r & q \\ r & 0 & -p \\ -q & p & 0 \end{bmatrix} \begin{bmatrix} 0 \\ 0 \\ 1 \end{bmatrix} = R \begin{bmatrix} q \\ -p \\ 0 \end{bmatrix}. \quad (4)$$

From this follows that the primary axis 130 can be made to achieve a commanded orientation if the angular velocity components p and q can be controlled, and will maintain an orientation if the components p and q are zero.

Each effector i (102a, 102b and 102c, for i={1, 2, 3}, respectively) has a single commandable input parameter, and produces a thrust force vector $f_{T_i}$ (FIG. 4(C)) and a torque vector about the vehicle's center of mass 120 $\tau_i$ (FIG. 4(B)), where the torque vector consists of the moment of the thrust force vector but may also include, in the case of propellers, aerodynamic reaction drag torque acting to oppose the propellers' rotation. Additionally, the vehicle's weight mg acts on the vehicle, and there exists an aerodynamic drag torque $\tau_d$ acting to oppose the vehicle's angular velocity.

The differential equation governing the evolution the angular velocity of a body with rotating effectors is given by $$I^B \dot{\omega}^B = \sum_j \tau_j - [\![ \omega^B \times ]\!] \left( I^B \omega^B + \sum_i I^{R_i} (\omega^B + \omega^{R_i}) \right). \quad (5)$$

where $\omega^{R_i}$ is the rotation rate vector of effector i, $I^B$ is the inertia matrix of the vehicle body, expressed in the body-fixed coordinate system; $I^{R_i}$ is the inertia matrix of propeller i; and $\tau_j$ includes the torque vector of each propeller i acting through the vehicle's center of mass 120, and any other torques acting on the vehicle (such as aerodynamic drag torque on the vehicle). Note that the inertia of the body is taken to include any components rigidly attached to the body, such as the vehicle structure, control units, sensors.

The left side of (5) contains the angular accelerations $\dot{p}$, $\dot{q}$; where control of these components allows the control of the orientation of the primary axis 130 through (4). The first term of the right side of (5) is the sum of all the torques acting on the vehicle. The remaining term of (5) expresses the cross coupling of the angular momentum in the system, due to taking the derivative in a non-inertial frame.

FIG. 4(B) shows the torque vectors $\tau_i$ produced by each of the three propellers on the vehicle's center of mass 120, and their components perpendicular to the primary axis. Because the perpendicular components are not collinear, their sum can be made to point in an arbitrary direction perpendicular to the primary axis, allowing to directly effect an angular acceleration of the vehicle, where the component of this angular acceleration perpendicular to the primary axis 130 can be made to point in any arbitrary direction perpendicular to the primary axis. Therefore, setting these torque vector components appropriately allows to control the angular velocity components p and q through (5), and control of p and q allow in turn the control of the vehicle's orientation z through (4).

FIG. 4(C) shows the thrust force vectors $f_{T_i}$ produced by each of the three propellers on the vehicle's center of mass 120, and their components acting in the direction of the primary axis. The figure also shows the weight of the vehicle mg. By orienting the vehicle's primary axis, and through the sum of the propeller's thrust force vectors, a total force is achieved. This total force can be oriented in a desired direction by the mechanism of orienting the primary axis 130 as described above.

The translational acceleration is related to the total forces through Newton's second law. Thus a translational acceleration of the vehicle can be effected through the total force, while this acceleration, in turn, allows to effect a translational velocity, which in turn allows to effect a change in the position of the vehicle.

FIG. 5(A) shows a vehicle configuration having only two effectors in the form of fixed-pitch propellers rotating in the same direction. Also shown is a coordinate system fixed with respect to the body of the vehicle, consisting of the directions x, y and z, chosen such that z points along the primary axis 130, and x points from effector two to effector one, and y following from the right-hand rule. For the sake of clarity of exposition, the following assumptions about the system are made for the derivation. Note that these assumptions are reasonable for the derivation of control schemes for practical vehicle configurations, and lead to practical and applicable control schemes.

The mass distribution of the vehicle body is such that the principle axes of inertia coincide with x, y and z, such that the inertia matrix $I^B$ is diagonal, with the components $$I^B = \begin{bmatrix} I_X^B & 0 & 0 \\ 0 & I_Y^B & 0 \\ 0 & 0 & I_Z^B \end{bmatrix}. \tag{6}$$

The effectors are propellers, mounted along the x axis of the body, each at a distance of l from the vehicle's center of mass 120.

The effectors are identical propellers, have a mass negligible when compared to that of the quadrocopter, have a diagonal inertia matrix $I^R$ whose magnitude is negligible compared to that of the vehicle body, and rotate around axes parallel to the primary axis.

$$I^R = \begin{bmatrix} I_X^R & 0 & 0 \\ 0 & I_Y^R & 0 \\ 0 & 0 & I_Z^R \end{bmatrix} \tag{7}$$

The magnitude of the vehicle body is negligible when compared to the magnitude of the angular velocity of either propeller.

The force vectors produced by the propellers $f_{T_i}$ are parallel, and parallel to the vehicle primary axis 130 as illustrated in FIG. 5(C), such that they can be expressed in the body-fixed coordinate frame as $$f_{T_i} = \begin{bmatrix} 0 \\ 0 \\ f_{T_i} \end{bmatrix} \tag{8}$$

(note the distinction between vector $f_{T_i}$, and the scalar $f_{T_i}$). The only other force assumed to act on the vehicle is its weight mg.

The components of the torque vectors produced by the propellers, acting through the vehicle's center of mass 120 and perpendicular to the primary axis, are collinear with and parallel to y as illustrated in FIG. 5(B). It is assumed that the component acting perpendicular to the primary axis 130 is exclusively due to the moment of the propeller's thrust vector force $f_{T_i}$ acting at the distance l from the center of mass 120, and that there is no torque component in the direction of x. The component of the torque parallel to the primary axis 130 is $\tau_{i\parallel}$ and is caused by the aerodynamic reaction drag torque to oppose the rotation of the propeller. Thus the propellers' torque vectors expressed in the body fixed frame are:

$$\tau_1 = \begin{bmatrix} 0 \\ -lf_{T_1} \\ \tau_{1\parallel} \end{bmatrix}, \quad \tau_2 = \begin{bmatrix} 0 \\ lf_{T_2} \\ \tau_{2\parallel} \end{bmatrix}. \tag{9}$$

The components of the aerodynamic drag torque $\tau_d$ acting to oppose the vehicle's sense of rotation will be assumed to act only parallel to z, such that $\tau_d=(0, 0, -\tau_d)$ (note the distinction between the vector $\tau_d$ and the scalar $\tau_d$).

Denoting again the rotation of the body-fixed frame with respect some inertial coordinate frame with R and the angular velocity of the body with $\omega^B$, the differential equation of R is as in (1). The orientation of the vehicle is again described by (3), with associated differential equation given by (4).

For this vehicle configuration the differential equation governing the evolution of the angular velocity is given by (5), with this time two effectors instead of three, restated here for clarity $$I^B \dot{\omega}^B = \sum_j \tau_j - [\omega^B \times]\left(I^B \omega^B + \sum_{i=1}^{2} I^R(\omega^B + \omega^{R_i})\right). \tag{10}$$

The angular velocity of propeller i with respect to the vehicle body, and expressed in the body-fixed frame, is $\omega^{R_i}=(0, 0, \omega^{R_i})$ (note again the distinction between the vector $\omega^{R_i}$ and scalar $\omega^{R_i}$).

The left hand side of (10) contains the angular acceleration, and simplifies to $$I^B \dot{\omega}^B = \begin{bmatrix} I_X^B \dot{p} \\ I_Y^B \dot{q} \\ I_Z^B \dot{r} \end{bmatrix}. \quad (11)$$

As before, the orientation of the vehicle is be controlled through the angular velocity components p and q The sum of all torques, the first term on the right hand side, contains the propellers' torque vectors and the aerodynamic drag torque opposing the vehicle's sense of rotation, and yields $$\sum_j \tau_j = \begin{bmatrix} 0 \\ l(-f_{T_1} + f_{T_2}) \\ -\tau_d + \tau_{1\|} + T_{2\|} \end{bmatrix}. \quad (12)$$

The final term of (10) expresses the cross coupling of the angular momentum in the system, due to taking the derivative in a non-inertial frame. Multiplying out the term, adding the components, and under the previous assumptions given yields $$[\omega^B \times] \left( I^B \omega^B + \sum_{i=1}^{2} I^R (\omega^B + \omega^{R_i}) \right) \approx \dots \quad (13)$$

$$\begin{bmatrix} (I_Z^B - I_Y^B)qr + I_Z^R(\omega^{R_1} + \omega^{R_2})q \\ -(I_Z^B - I_X^B)pr - I_Z^R(\omega^{R_1} + \omega^{R_2})p \\ (I_Y^B - I_X^B)pq \end{bmatrix}$$

From the above, writing out (10) in its components yields the three scalar differential equations $$I_X^B \dot{p} = ((I_Y^B - I_Z^B)r - I_Z^R(\omega^{R_1} + \omega^{R_2}))q \quad (14)$$

$$I_Y^B \dot{q} = ((I_Z^B - I_X^B)r + I_Z^R(\omega^{R_1} + \omega^{R_2}))p + \dots \quad (15)$$
$$(-f_{T_1} + f_{T_2})l$$

$$I_Z^B \dot{r} = (I_X^B - I_Y^B)pq + \tau_{1\|} + \tau_{2\|} - \tau_d. \quad (16)$$

From this can be seen that sending control signals to the propellers allows to directly effect an angular acceleration q about x. Because it has a component perpendicular to the primary axis, this directly produced angular acceleration is linearly independent of the primary axis. Furthermore, through the above mentioned angular acceleration an angular velocity q can be achieved.

Thus, by turning the body through a secondary axis lying along y, the vehicle's angular velocity components about the primary axis 130 (r) and the secondary axis (q) will interact to produce an angular acceleration (and thus a turning) about a turning axis, here x. Important to note is that the secondary axis lies at a non-zero angle with respect to the primary axis 130 (i.e. is linearly independent of the primary axis), and that the turning axis lies at a non-zero angle to both the primary and secondary axes (i.e. the turning axis is linearly independent of both). Concretely, for this vehicle, this means that although the propellers can not produce a torque about the x axis, the component p of angular velocity lying along x can be affected, and the primary axis' orientation with respect to an inertial frame can be controlled. Similarly, for other vehicles, this means that the above effect can be actively exploited for their control rather than counteracted or otherwise compensated for.

Furthermore, this orientation can be maintained by bringing the angular velocity components p and q to zero, and commanding the propellers such that $f_{T_1} = f_{T_2}$ such that $\dot{p} = 0$ and $\dot{q} = 0$ by (14) and (15), respectively. The vehicle's angular velocity will then point along the primary axis 130 and the orientation will be constant.

The component of the vehicle's angular velocity along the primary axis, r, will be dominated by the torques $\tau_{i\|}$ and the drag torque $\tau_d$. Since the drag torque will typically monotonically increase with r, there will be an imbalance in $\tau_{1\|} + \tau_{2\|} - \tau_d$ at low speeds, such that the vehicle will increase this component of angular velocity, and thus the vehicle has a natural tendency to rotate about the primary axis. For fixed pitch propellers, there is typically a strongly linear relationship between the magnitude of the thrust force $f_{T_i}$ and the aerodynamic reaction drag torque $\tau_{i\|}$.

A translational acceleration of the vehicle can now be effected, by using the difference of the two forces $f_{T_1}$ and $f_{T_2}$ to attain and maintain an orientation of the primary axis, and using the sum of the two propeller thrust forces to achieve a resultant force acting on the body.

Note that while the above derivation was made under specific assumptions, these assumptions are reasonable for the derivation of control schemes for practical vehicle configurations and lead to practical and applicable control schemes. The above results, therefore, hold for a broader range of circumstances and should be interpreted as such.

Furthermore, it will be readily apparent to one skilled in the art that the specific control law used can vary, and can be derived using linear methods such as the linear quadratic regulator (LQR), using pole placement, various robust control methods, or nonlinear control methods.

Figure 6:
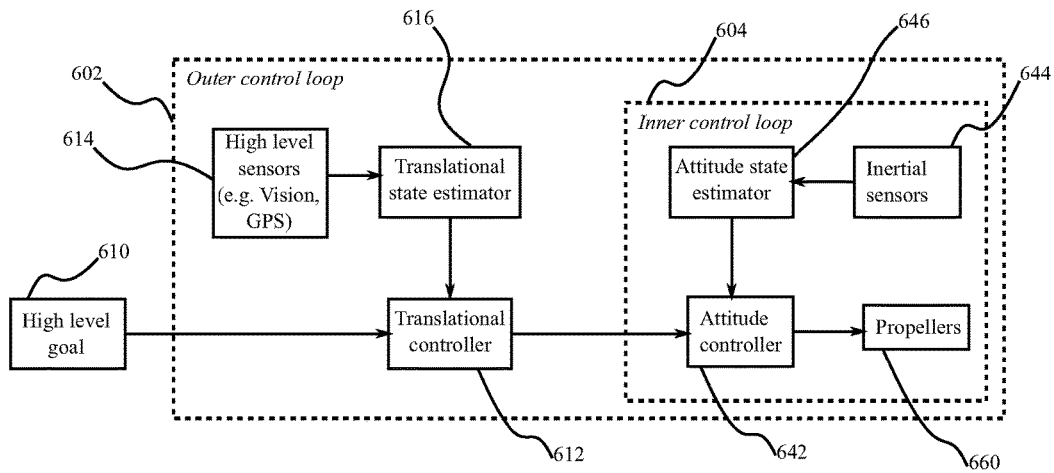
FIG. 6 shows a block diagram for explaining the control architecture.

FIG. 6 shows an exemplary implementation of the disclosed method on a flying vehicle, where the method is broken down into an outer 602 and an inner 604 control loop. Other implementations of the disclosed method will be apparent to those skilled in the arts. A high level goal 610 is given by a user and is sent to a translational controller 612. High level sensors 614, such as GPS sensors and onboard vision systems send measurements to a translational state estimator 616, which estimates the vehicles translational state and sends this estimate to the translational controller. The translational controller generates a desired translational acceleration of the body in order to achieve the high level goal.

An attitude controller 642 receives this desired translational acceleration, and sends control signals to each of the effectors 660. This attitude controller 642 computes a commanded orientation of the vehicle's primary axis 130 and a total commanded force that results in the desired acceleration; then using the disclosed method to generates a control signal for each effector. Sensor measurements are passed to a state estimator 646 which estimates the vehicle's rotation and angular velocity and sends these estimates to the attitude controller. The sensor measurements are obtained from inertial sensors 644, which may include accelerometers, rate gyroscopes. Further examples of onboard sensors may include visual sensors such as cameras, range sensors, height sensors and relative airspeed sensors.

The present invention allows the design and control of novel vehicles. FIG. 7(A), FIG. 7(B) and FIG. 7(C) show vehicles with three, four, and one effectors 102, respectively, with all effectors 102 in the form of propellers spinning in the same direction. The aerodynamic reaction drag torque opposing the propellers' rotation results in the entire vehicle spinning 118 around its primary axis 130, passing through its center of mass 120. All of these sample embodiments have desirable properties with respect to their design and control which can be exploited by those skilled in the art given the benefits of the present disclosure.

Figure 7:
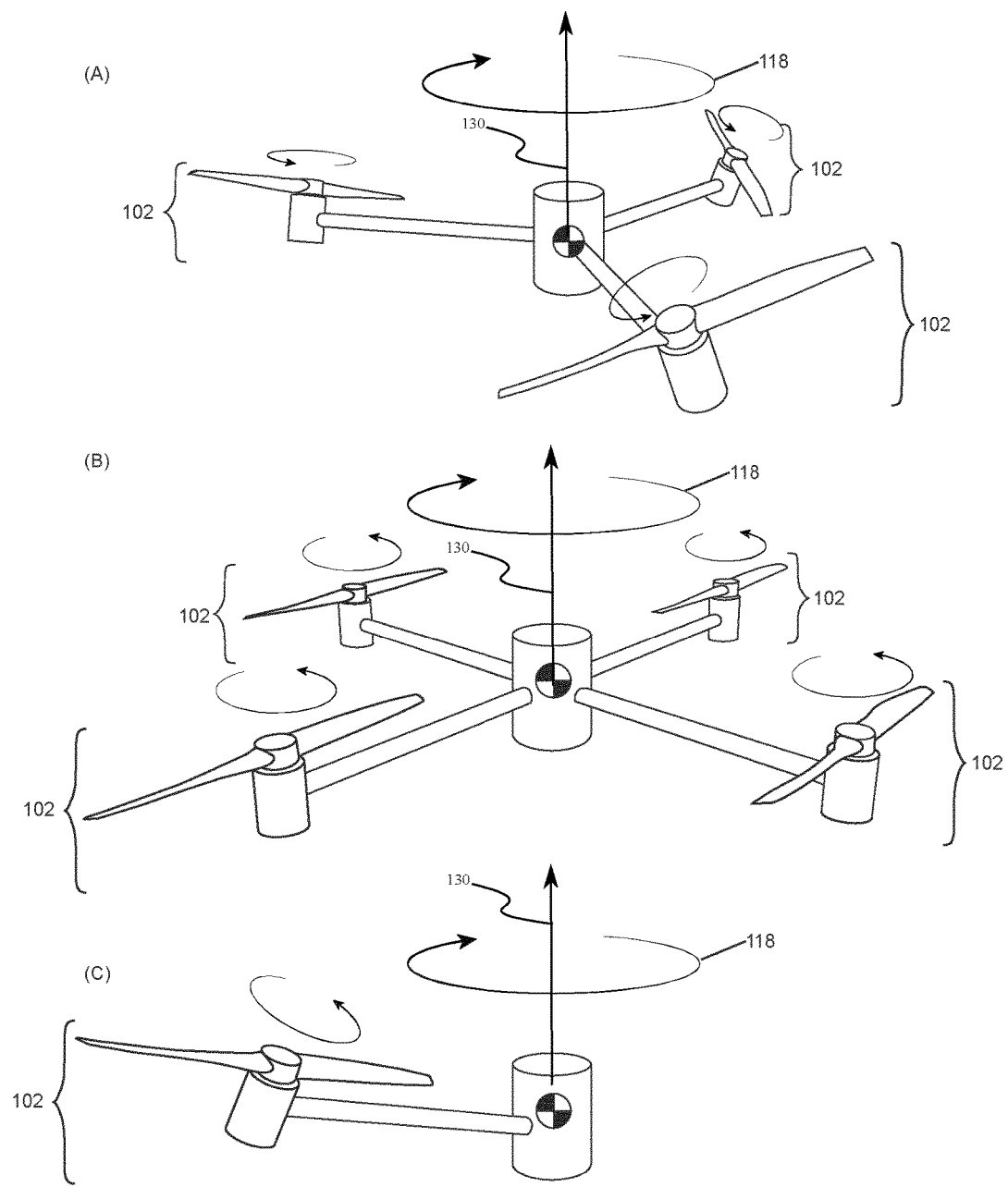
FIG. 7 shows schematics of three further preferred embodiments of alternative aerial vehicles configured according to the disclosed invention.

Because all the propellers for the vehicles shown in FIG. 7 will produce positive torque components in the direction of the primary axis, these vehicles will tend to spin 118 at a high angular velocity about the primary axis 130 during operation. Such arrangements could have many beneficial aspects, such as good disturbance rejection to crosswinds, and specifically good rejection of disturbances which would act to disturb the orientation of the vehicle, where this disturbance rejection is aided by the high angular momentum of the vehicle. These vehicles will be much more stable than comparable multicopters as known in the state of the art. Furthermore, these vehicles will have desirable properties pertaining to state observability.

Figure 8:
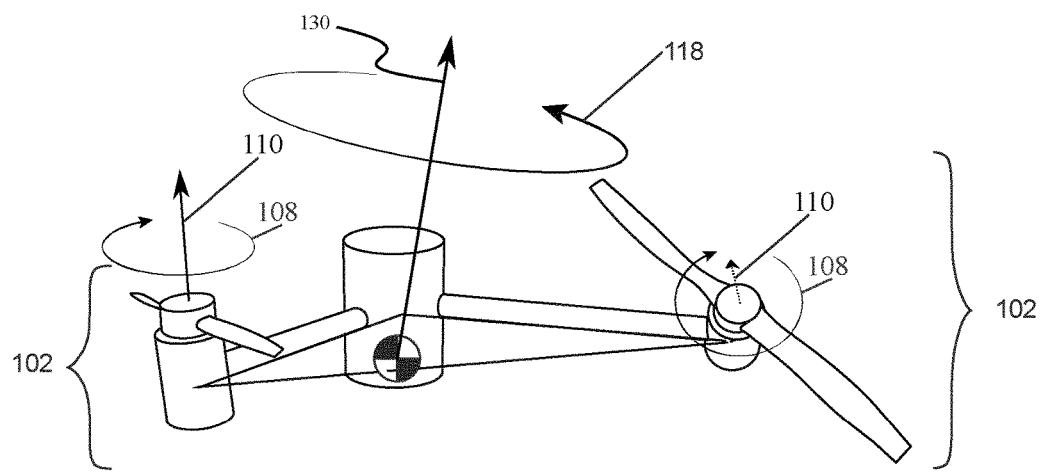
FIG. 8 shows a further sample embodiment of an alternative vehicle configuration that can be controlled using the disclosed control method.

FIG. 8 shows another embodiment of a vehicle configuration that can be controlled using the disclosed control scheme. This vehicle has two effectors 102 in the form of propellers, with the propellers having different sizes, having axes of rotation 110 which are not parallel to each other and not parallel to the primary axis 130, where the center of mass 120 of the vehicle does not coincide with the geometric center of the body, and where the effectors are mounted at different distances from the vehicle's body.

Figure 9:
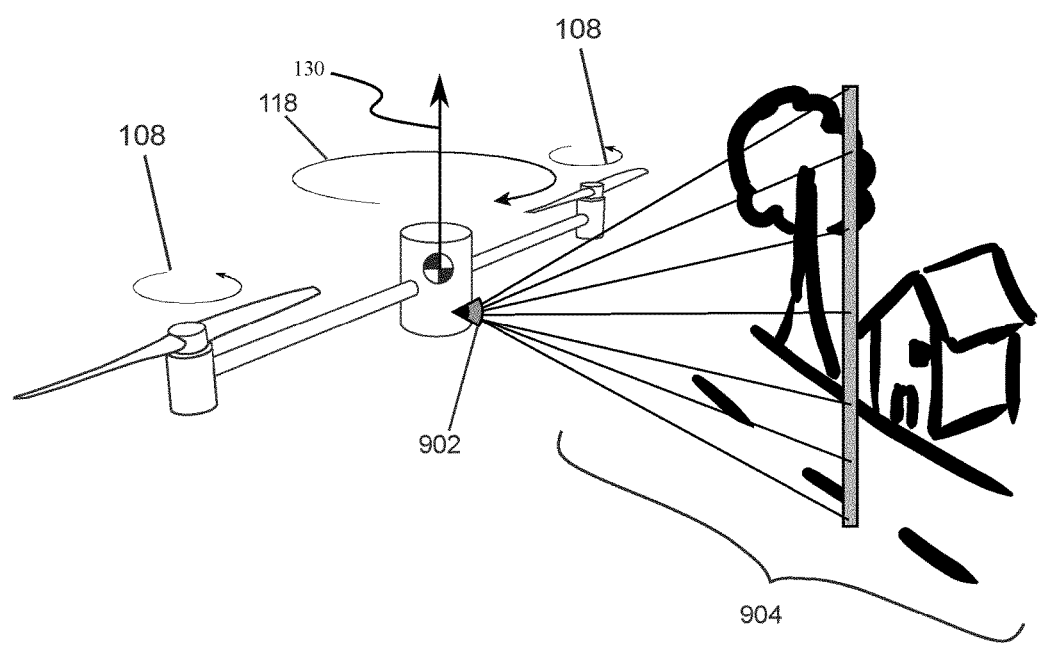
FIG. 9 shows a further sample embodiment of a two-rotor vehicle configuration being used with a line-scan type sensor to image the surrounding environment.

FIG. 9 shows a sample embodiment where the volitant vehicle is used as a sensor platform, for example for a line-scan type sensor 902, to image the surrounding environment 904, where the inherent rotation 118 of the vehicle is used to scan around the vehicle with the line scanner. Both, continuous mode imaging (e.g., with camera-type, radar, or laser sensors) and snapshot imaging (e.g., photography) are possible. By adjusting for constant changes in sensor position due to the vehicle's rotation, the resulting images can be post-processed, e.g. to yield panoramic renderings.

Figure 10:
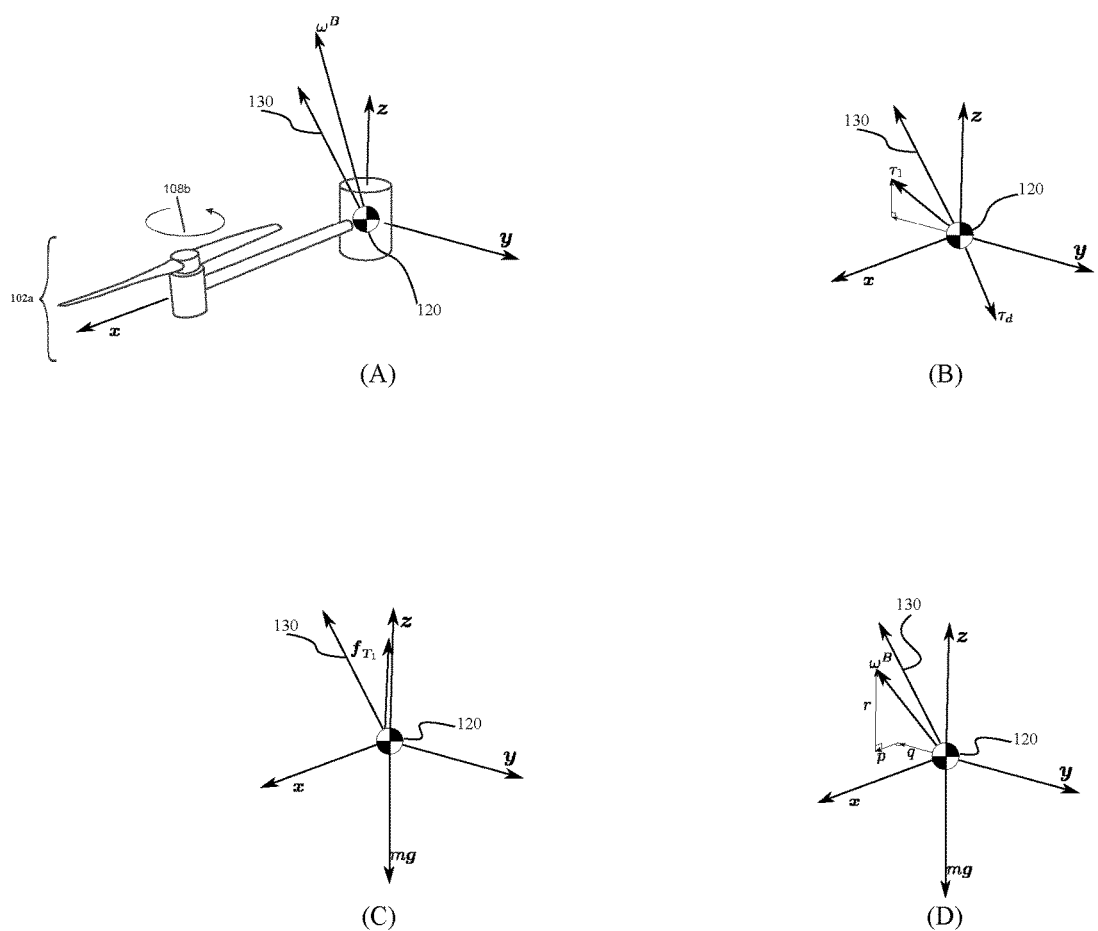
FIG. 10 shows a schematic of a volitant vehicle with a single propeller, used to explain the derivation of the control method.

FIG. 10 shows a volitant vehicle with a single effector 102 in the shape of a fixed pitch propeller, utilising the present invention to control the vehicle. The thrust force $f_{T_1}$, points along the body z axis as shown in FIG. 10(C), and the respective torque vector as shown in FIG. 10(B). The imbalance of the torque produced by the propeller causes the vehicle to rotate with angular velocity $\omega^R$ such that a drag torque acting on the body $\tau_d$ acts to balance the propeller torques. The present invention is used to control the vehicle's angular velocity to lie along the primary axis 130, while a desired orientation of the primary axis 130 with respect to a predefined reference frame is attained.

Figure 5:
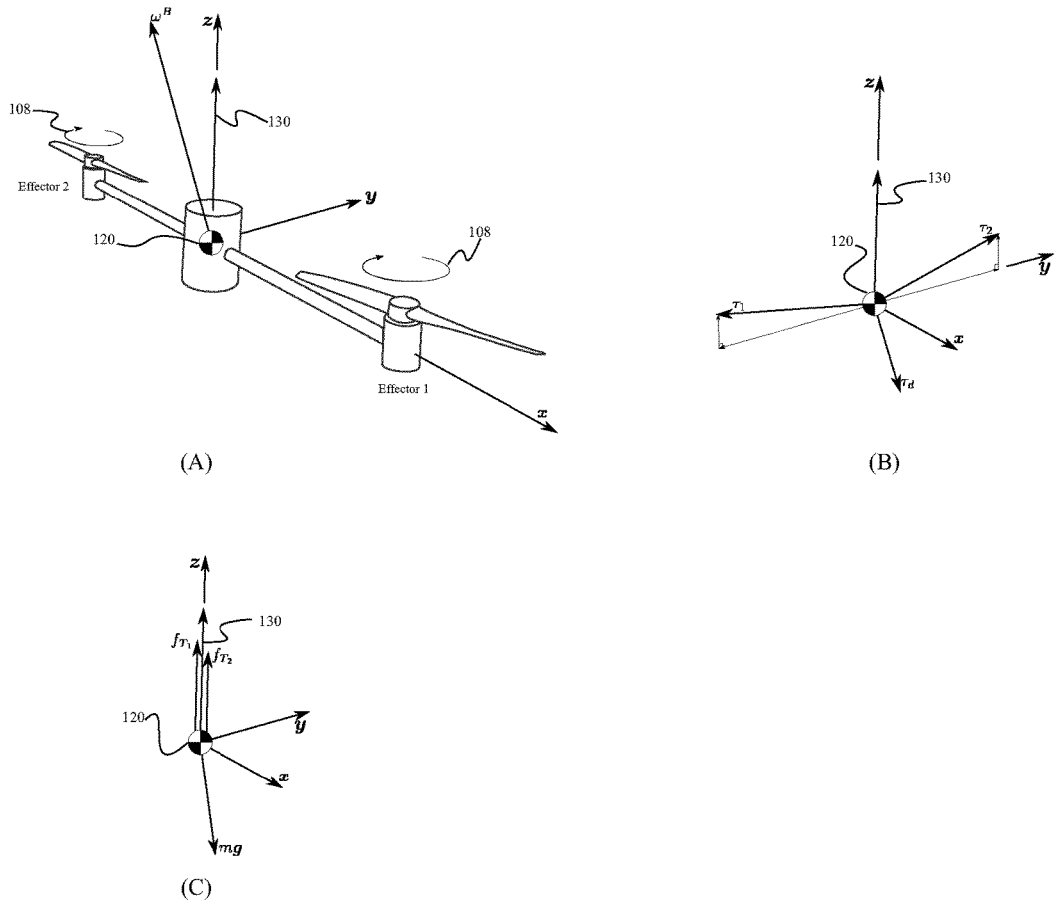
FIG. 5 shows a schematic of a vehicle with two fixed-pitch propellers driven by rigidly attached electric motors, and its main torques and forces used to explain the derivation of the control method.

In general, the primary axis 130 will not lie along z—one method for determining the direction of the primary axis is as follows, while referring to the notation introduced previously for FIG. 5 and FIG. 4. Let $I^B$ be the inertia matrix of the vehicle, expressed in the body frame, such that $$I^B = \begin{bmatrix} I_X^B & 0 & 0 \\ 0 & I_X^B & 0 \\ 0 & 0 & I_Z^B \end{bmatrix}, \quad (17)$$

where it has been assumed for simplicity that the inertia matrix is diagonal and that the vehicle is symmetric such that the inertia about x equals that about y. The angular momentum of the propellers will be neglected here. Again, $\omega^B=(p, q, r)$ represents the vehicle body's angular velocity expressed in the body frame, as shown in FIG. 10(D).

The propeller produces a thrust force vector $f_{T_1}$, expressed in the body frame as $f_{T_1}=(0, 0, f_{T_1})$. Furthermore, the propeller produces a torque vector, passing through the centre of mass 120, which is expressed in the body frame as $$\tau_1 = \begin{bmatrix} 0 \\ -lf_{T_1} \\ \tau_{z1} \end{bmatrix}, \quad (18)$$

For simplicity, it will be assumed that the component $\tau_{z_1}$ is proportional to the thrust force, such that $\tau_{z_1}=\kappa f_{T_1}$. An aerodynamic torque $\tau_D$ is also acting on the body, assumed for simplicity here to act only in the direction of z, and proportional to r such that $\tau_D=(0, 0, C_D r)$. The differential equation governing the evolution of the body rates can now be written as $$I^B \dot{w}^B = -[\![\omega^B \times]\!] I^B w + \tau_1 + \tau_D \quad (19)$$

which can be expanded and rewritten to yield the following three differential equations:

$$\dot{p} = \frac{I_X^B - I_Z^B}{I_X^B} qr \quad (20)$$

$$\dot{q} = -\frac{I_X^B - I_Z^B}{I_X^B} pr - \frac{l}{I_X^B} f_{T_1} \quad (21)$$

$$\dot{r} = \kappa f_{T_1} - C_D r. \quad (22)$$

Let $n=(n_x, n_y, n_z)$ be a unit vector fixed in the inertial frame. This vector evolves according to the differential equation $$\dot{n} = -[\![w \times]\!] n. \quad (23)$$

The goal is to now find the commanded force $f_{T_1}$ that results in a steady rotational rate w and a steady n, such that n then describes the primary axis expressed in the body frame. This implies that $\dot{w}=0$ and that $\dot{n}=0$. From (23) this implies that $n=\epsilon w$, where $\epsilon^{-1}=\|w\|$ such that n is a unit vector.

This yields a set of algebraic equations with scalar unknowns to solve for $(p, q, r, n_x, n_y, n_z, f_T, \epsilon)$. This can be resolved by adding one additional constraint, specifically that the thrust force be able to balance the weight of the vehicle mg:

$$f_{T_1} n_z = mg \quad (24)$$

This leaves a set of eight algebraic equations in eight unknowns, from which the steady-state rotational velocity $\omega^B$, the direction of the primary axis in the body frame n and the steady state thrust force $f_{T_1}$ can be calculated.

A stabilizing controller can now be designed to bring the vehicle from some instantaneous angular velocity and orientation to the steady state solution described above. Furthermore, the orientation of the primary axis in the inertial frame can be used to translate the vehicle in space. One method of creating such a controller would be to linearise the equations of motion about the equilibrium, and then do a Linear Quadratic Control synthesis.

Note that because the effector thrust is not aligned with the gravity vector, the vehicle's centre of mass will not be stationary, but will instead "wobble" about an orbit. This because the primary axis is not aligned with the direction of the effector thrusts, such that the component in the direction of gravity cancels out the weight, but the components perpendicular to gravity constantly cause the vehicle to accelerate to the centre of its orbit. Thus, when using the above described solution, the vehicle's centre of mass is unable to remain stationary at a point in space, but will instead have a continuous motion around this desired point in space.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

TABLE OF SYMBOLS AND FIGURE NUMERALS

| Num. | Name |
|---|---|
| 102 | Effectors |
| 102a | Effector 1 |
| 102b | Effector 2 |
| 102c | Effector 3 |
| 104 | Propellers |
| 106 | Motors |
| 108 | Direction of propeller rotation |
| 108a | Clockwise direction of propeller rotation |
| 108b | Counterclockwise direction of propeller rotation |
| 110 | Axis of rotation of propeller |
| 112 | Vehicle body |
| 114 | Mechanical structure |
| 118 | Direction of sustained vehicle rotation about primary axis |
| 120 | Center of mass of vehicle |
| 130 | Primary axis |
| 130 | Target orientation of primary axis |
| 160 | Predefined reference frame |
| 302 | Flight Module |
| 304 | Input Unit |
| 306 | Control Unit |
| 308 | Evaluation Unit |
| 310 | Sensing Unit |
| 312 | Memory Unit |
| 314 | Input Signal for Effectors |
| 602 | Outer control loop |
| 604 | Inner control loop |
| 610 | High level goal |
| 612 | Translational controller |
| 614 | High level sensors (e.g. Vision, GPS) |
| 616 | Translational state estimator |
| 642 | Attitude controller |
| 644 | Inertial sensors |
| 646 | Attitude state estimator |
| 660 | Propellers |
| 902 | Line-scan sensor |
| 904 | Surrounding environment |
| $f_{D_i}$ | Rotor drag force vectors of rotor i |
| $f_{T_i}$ | Rotor thrust force vectors of rotor i |
| $f_{T_i}$ | Thrust force for each effector i |
| mg | Weight of the vehicle |
| p, q | Components of the angular velocity |
| $\dot{p}, \dot{q}$ | Components of the angular acceleration |
| $I^B$ | Inertia matrix |
| $f_{T_i}$ | Thrust force vectors |
| $I^B$ | Inertia matrix of the vehicle body |
| $I^{R_i}$ | Inertia matrix of propeller i |
| n | Tilt of the primary axis |
| R | Rotation matrix |
| x, y, z | Axes of the coordinate system |
| $\tau_i$ | Torque vector |
| $\tau_{i\parallel}$ | Torque vector component parallel to the primary axis |
| $\tau_{i\perp}$ | Torque vector component perpendicular to the primary axis |
| $\tau_d$ | Aerodynamic torque (scalar) |

-continued

TABLE OF SYMBOLS AND FIGURE NUMERALS

| Num. | Name |
|---|---|
| $\tau_d$ | Aerodynamic torque (vector) |
| $\tau_i$ | Torque vector of rotor i |
| $\omega^B$ | Angular velocity of the body |
| $\omega^V$ | Angular velocity of the vehicle in an inertial frame |
| $\omega^{R_i}$ | Angular velocity of rotor i with respect to the vehicle body (scalar) |
| $\omega^{R_i}$ | Angular velocity of rotor i with respect to the vehicle body (vector) |

The invention claimed is:

1. A volitant vehicle comprising,
   (a) a body,
   (b) a control unit being configured to
      i. compute an estimate of the orientation of a primary axis of said body with respect to a predefined reference frame, wherein said primary axis is an axis about which said vehicle rotates when flying; and
   (c) one or more propellers attached to the body, wherein each of said one or more propellers
      A. has an axis of rotation that is fixed with respect to said body,
      B. wherein said one or more propellers is/are configured so that, during use said one or more propellers produce all thrust force necessary to lift the body, and all torque force that rotates the body about said primary axis,
         said thrust force having a component along said primary axis,
         said torque having a component along the primary axis constructively contributing to the vehicle rotating about said primary axis,
         said torque having a component perpendicular to said primary axis, and
   wherein all of said one or more propellers that contribute to said thrust force and torque force that lift and rotate said body during use, rotate with the same handedness about their respective thrust forces, and each of said one or more propellers is arranged such that the axis of rotation of each of said one or more propellers is substantially parallel to the primary axis,
   wherein said control unit is further configured to compute said target orientation of said primary axis using said target acceleration of said volitant vehicle such that said target orientation is aligned with the vector sum of said target acceleration and the gravitational acceleration,
   wherein said control unit is configured to compute said target orientation of said primary axis using said target acceleration of said volitant vehicle such that said target orientation is aligned with the vector sum of said target acceleration and the gravitational acceleration, using the equation ñ=(a−g)/∥a−g∥, wherein the vector a represents said target acceleration and the vector g represents the gravitational acceleration, and the vector ñ represents said target orientation, and ∥·∥ represents the Euclidean norm of a vector.

2. A volitant vehicle according to claim 1, wherein said control unit is further configured to control all of said one or more propellers such that all of said one or more propellers collectively
   produce a torque perpendicular to said primary axis causing said vehicle to move such that the orientation of said primary axis converges to a target orientation with respect to said predefined reference frame.

3. A volitant vehicle according to claim 1 wherein each of said one or more propellers is configured to
contribute to a resultant thrust force acting on said vehicle, by having each of said one or more propellers attached to the body such that
the thrust force having said component along the primary axis constructively, contributes to the component of the resultant thrust force along the primary axis.

4. A volitant vehicle according to claim 2, wherein the thrust force of each of said one or more propellers contributes a fraction of at least 0.5/N to the component of the resultant thrust force along the primary axis when the orientation of the primary axis has converged, where N is the number of said one or more propellers.

5. A volitant vehicle according to claim 3, wherein, for each of said one or more propellers,
a) produce the thrust force having said component along the primary axis constructively contributing to the component of the resultant thrust force along the primary axis,
b) and produce a torque with said component along the primary axis constructively contributing to the vehicle rotating about said primary axis when producing said thrust force, and
said component perpendicular to the primary axis, achieved through the mechanical arrangement of said axis of rotation.

6. A volitant vehicle according to claim 5, wherein said mechanical arrangement comprises attaching each of the one or more propellers
to an effector,
said effector being rigidly attached to said body.

7. A volitant vehicle according to claim 2, wherein, for each of the one or more propellers, the torque comprises
a) the force acting at a distance from the centre of mass of the vehicle, b) a reaction torque opposing the propeller's sense of rotation, caused by drag acting on the propeller blades moving through the air.

8. A volitant vehicle according to claim 2, wherein, for each of the one or more propellers, at least 50% of the torque component perpendicular the primary axis is due to the thrust force acting at a distance from the centre of mass of the vehicle.

9. A volitant vehicle according to claim 1, furthermore comprising
an input unit for receiving data from sensors and/or users,
a sensing unit for measuring data representative of the motion of said volitant vehicle, and
an evaluation unit operationally connected to said sensing and/or input unit,
wherein
a) said evaluation unit is configured to provide data representative of the motion of said volitant vehicle based on said data received from said sensing unit, and
b) said evaluation unit is operationally connected to said control unit to provide data, and
c) said control unit s structured and arranged to perform said computing of an estimate of the orientation of the primary axis based on said data provided by said evaluation unit.

10. The volitant vehicle according to claim 1, wherein said control unit is configured such that, during use, the control unit controls said one or more propellers to collectively produce a torque along said primary axis to cause said volitant vehicle to rotate about said primary axis at a speed greater than 0.5 revolutions per second.

11. The volitant vehicle according to claim 1, wherein said control unit is further structured and arranged
a) to compute a target acceleration for said volitant vehicle based on said data provided by said evaluation unit, and
b) to use said target acceleration to compute said target orientation of said primary axis for said volitant vehicle, and
c) to send said control signals to said effectors such that said one or more propellers is controlled such that the thrust collectively produced by said one or more propellers accelerates said volitant vehicle at said target acceleration.

12. The volitant vehicle according to claim 1, wherein said control unit is further configured
to compute a target thrust force magnitude based on said data provided by said evaluation unit, and
to send said control signals to said effectors such that the magnitude of the resultant thrust force over a predefined period equals the target thrust force magnitude.

13. The volitant vehicle according to claim 12, wherein said control unit is further configured to compute said target thrust force magnitude using said target acceleration of said volitant vehicle by,
computing said target acceleration,
computing said target thrust force magnitude as $$f_{des}=m\|a-g\|$$

wherein $f_{des}$ represents the target thrust force magnitude, $\|\cdot\|$ represents the Euclidean norm of a vector, a represents the said target acceleration, g represents the acceleration due to gravity and in represents the mass of said volitant vehicle.

14. The volitant vehicle of claim 1, said volitant vehicle further comprising a sensor that is operationally connected to said sensing unit and structured and arranged
to detect data representative of the motion of the volitant vehicle, and
to provide said data representative of the motion of the volitant vehicle to said sensing unit.

15. The volitant vehicle according to claim 1, wherein said control unit is mechanically independent of said body and said one or more propellers, and operationally connected to the volitant vehicle via a wireless connection.

16. The volitant vehicle according to claim 1, wherein said one or more propellers comprises at most three propellers.

17. A method for operating the volitant vehicle, said volitant vehicle comprising,
(a) a body,
(b) a control unit being configured to
   i. compute an estimate of the orientation of a primary axis of said body with respect to a predefined reference frame, wherein said primary axis is an axis about which said vehicle rotates when flying; and
(c) one or more propellers attached to the body, wherein each of said one or more propellers
   A. has an axis of rotation that is fixed with respect to said body,
   B. wherein said one or more propellers is/are configured so that, during use, said one or more propellers produce all thrust force necessary to lift the body, and all torque force that rotates the body about said primary axis, said thrust force having a component along the primary axis,
said torque having a component along the primary axis constructively contributing to the vehicle rotating about said primary axis,
said torque having a component perpendicular to the primary axis, and
wherein all of said one or more propellers that contribute to said thrust force and torque force that lift and rotate the body during use, rotate with the same handedness about their respective thrust forces, and each of said one or more propellers is arranged such that the axis of rotation of each of said one or more propellers is substantially parallel to the primary axis,
the method comprising the steps of,
a) computing an estimate of the orientation of a primary axis of said body with respect to a predefined reference frame, wherein said primary axis is an axis about which said vehicle rotates when flying;
b) controlling said one or more propellers, based on said estimate of the orientation of the primary axis of said body with respect to said predefined reference frame, such that
i. each of said one or more propellers simultaneously produces a thrust force and a torque,
said thrust force having a component along the primary axis,
said torque having a component along the primary axis constructively contributing to the vehicle rotating about said primary axis,
said torque having a component perpendicular to the primary axis,
ii. wherein said one or more propellers is/are configured so that during use said one or more propellers produce a first angular acceleration around the primary axis, and a second angular acceleration around a secondary axis, wherein the secondary axis is linearly independent of the primary axis, and wherein the first and second angular accelerations around the primary and the secondary axes interact to produce a target angular acceleration about a tertiary axis which is linearly independent of the primary and secondary axes, so as to control the orientation of said primary axis's orientation when the vehicle is undergoing a yawing motion; and
iii. computing by the control unit target orientation of said primary axis using said target angular acceleration of said volitant vehicle such that said orientation is aligned a vector sum of said target acceleration and gravitational acceleration, using the equation ñ=(a−g)/∥a−g∥, wherein vector a represents said target acceleration and vector g represents the gravitational acceleration, and the vector ñ represents said target orientation, and ∥·∥ represents the Euclidean norm of a vector.

18. A method according to claim 17, further comprising the steps of,
a) computing a target translational velocity of said vehicle,
b) computing a target position of said vehicle,
c) estimating current translational velocity of said vehicle,
d) estimating the current position of said vehicle,
e) using at least one f said target translational velocity, said target position, said current translational velocity and said current position of said vehicle, to compute said target acceleration.

19. A toy, comprising the volitant vehicle of claim 1.

20. A volitant vehicle comprising,
(a) a body,
(b) a control unit being configured to
i. compute an estimate of the orientation of a y axis of said body with respect to a predefined reference frame, wherein said primary axis is an axis about which said vehicle rotates when flying; and
(c) one or more propellers attached to the body, wherein each of said one or more propellers
A. has an axis of rotation that is fixed with respect to said body,
B. wherein said one or more propellers is/are configured so that, during use, said one or more propellers produce all thrust force necessary to lift said body, and all torque force that rotates the body about said primary axis,
said thrust force having a component along said primary axis,
said torque having a component along said primary axis constructively contributing to the vehicle rotating about said primary axis,
said torque having a component perpendicular to said primary axis, and
wherein all of said one or more propellers that contribute to said thrust three and torque force that lift and rotate the body during use, rotate with the same handedness about their respective thrust forces, and each of said one or more propellers is arranged such that the axis of rotation of each of said one or more propellers is substantially parallel to the primary axis, and
wherein said control unit is further configured to compute said target orientation of said primary axis using said target acceleration of said volitant vehicle by computing said target orientation using the equation ñ=(a−g)/∥a−g∥, wherein the vector a represents said target acceleration and the vector g represents the gravitational acceleration, and the vector ñ represents said target orientation, and ∥·∥ represents the Euclidean norm of a vector.

21. A volitant vehicle according to claim 1, wherein the angular acceleration about a tertiary axis is used to move said primary axis to a target direction.

22. A volitant vehicle according to claim 1, wherein said one or more propellers generate aerodynamic reaction torques which cause the vehicle to follow a sustained yawing motion around the primary axis during flight, wherein said sustained yawing motion provides angular momentum effects which provide stability against disturbances.

23. A volitant vehicle according to claim 1, wherein said one or more propellers is/are configured so that during use said one or more propellers produce a first angular acceleration around the primary axis, and a second angular acceleration around a secondary axis, wherein the secondary axis is linearly independent of the primary axis, and wherein the first and second angular accelerations around the primary and the secondary axes interact to produce a target angular acceleration about a tertiary axis which is linearly independent of the primary and secondary axes, so as to control the orientation of said primary axis's orientation when the vehicle is undergoing a yawing motion.

24. A volitant vehicle comprising,
(a) a body,
(b) a control unit being configured to i. compute an estimate of the orientation of a primary axis of said body with respect to a predefined reference frame, wherein said primary axis is an axis about which said vehicle rotates when flying; and (c) one or more propellers attached to the body, wherein each of said one or more propellers A. has an axis of rotation that is fixed with respect to said body, B. wherein said one or more propellers is/are configured so that, during use said one or more propellers produce all thrust force necessary to lift the body, and all torque force that rotates the body about said primary axis, said thrust force having a component along said primary axis, said torque having a component along the primary axis constructively contributing to the vehicle rotating about said primary axis, said torque having a component perpendicular to said primary axis, and wherein all of said one or more propellers that contribute to said thrust force and torque force that lift and rotate said body during use, rotate with the same handedness about their respective thrust forces, and each of said one or more propellers is arranged such that the axis of rotation of each of said one or more propellers is substantially parallel to the primary axis, and wherein said one or more propellers is/are configured so that during use said one or more propellers produce a first angular acceleration around the primary axis, and a second angular acceleration around a secondary axis, wherein the secondary axis is linearly independent of the primary axis, and wherein the first and second angular accelerations around the primary and the secondary axes interact to produce a target angular acceleration about a tertiary axis which is linearly independent of the primary and secondary axes, so as to control the orientation of said primary axis's orientation when the vehicle is undergoing a yawing motion, wherein said one or more propellers generate aerodynamic reaction torques which cause the vehicle to follow a sustained yawing motion around the primary axis during flight, wherein said sustained yawing motion provides angular momentum effects which provide stability against disturbances, wherein said control unit is further configured a) to compute a target acceleration for said volitant vehicle based on said data provided by said evaluation unit, and b) to use said target acceleration to compute said target orientation of said primary axis for said volitant vehicle, and c) to send said control signals to said effectors such that said one or more propellers is controlled such that the thrust collectively produced by said one or more propellers accelerates said volitant vehicle at said target acceleration;

wherein said control unit is further configured to compute said target orientation of said primary axis using said target acceleration of said volitant vehicle by computing said target orientation using the equation $$\tilde{n} = (a-g)/\|a-g\|$$

wherein the vector a represents said target acceleration and the vector g represents the gravitational acceleration, and the vector n represents said target orientation, and represents the Euclidean norm of a vector.

* * * * *